July 10, 1956  G. T. PERKINS ET AL  2,753,714
ELECTRIC THERMOMETER
Filed July 21, 1953 3 Sheets-Sheet 1
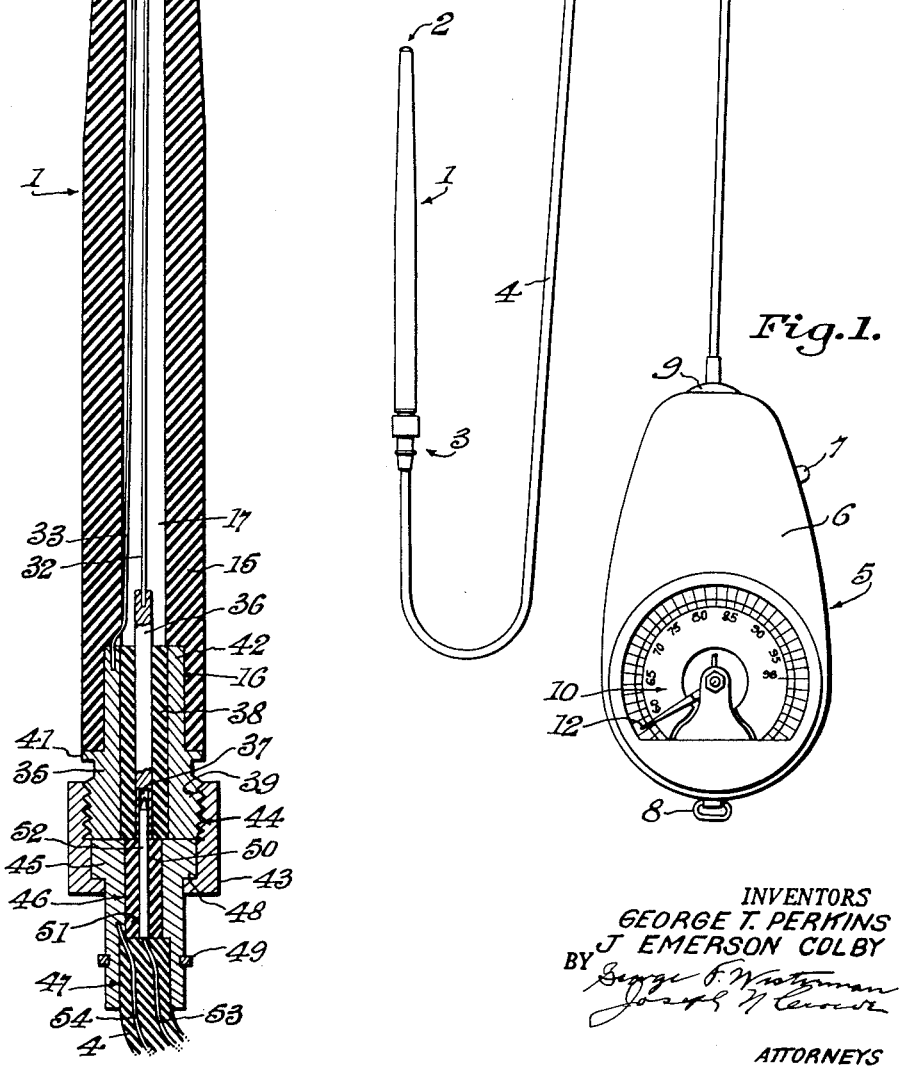
INVENTORS
GEORGE T. PERKINS
J. EMERSON COLBY
BY
ATTORNEYS July 10, 1956
G. T. PERKINS ET AL
2,753,714
ELECTRIC THERMOMETER
Filed July 21, 1953
3 Sheets-Sheet 2
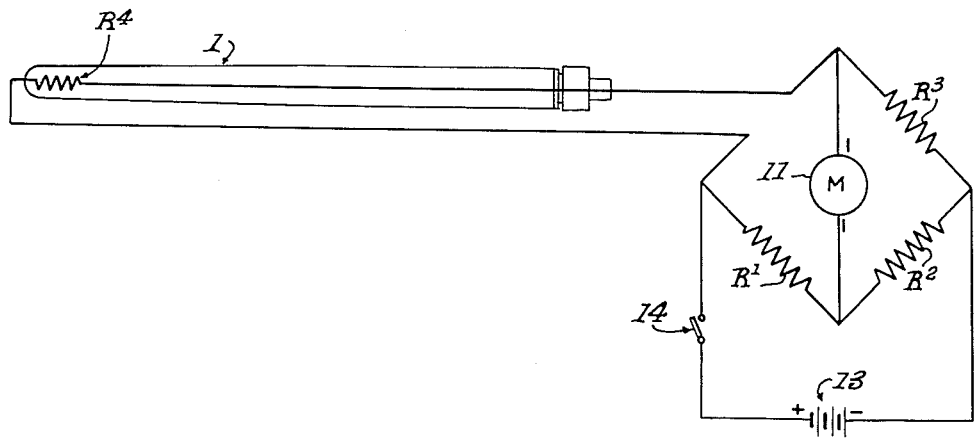
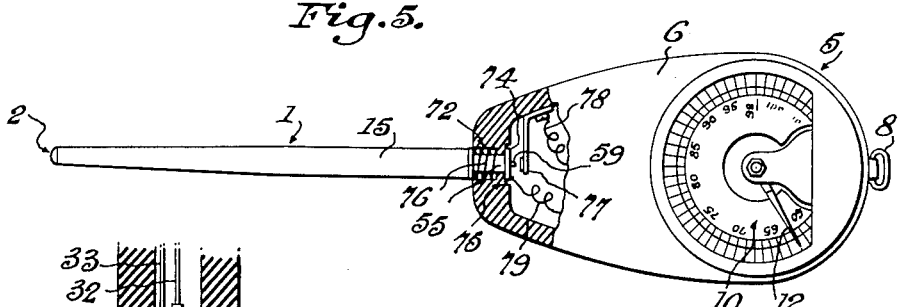
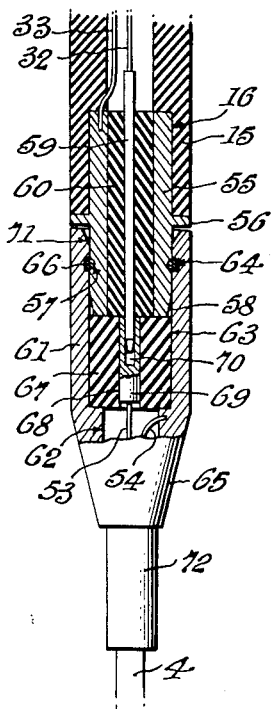
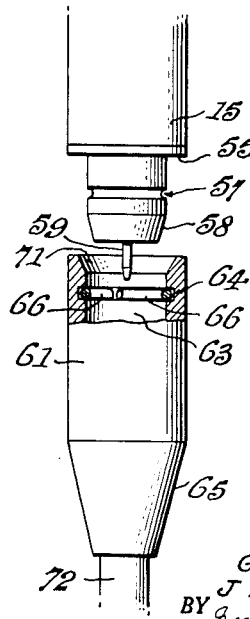
INVENTORS
GEORGE T. PERKINS
J. EMERSON COLBY
BY
ATTORNEYS July 10, 1956
G. T. PERKINS ET AL
2,753,714
ELECTRIC THERMOMETER
Filed July 21, 1953
3 Sheets-Sheet 3
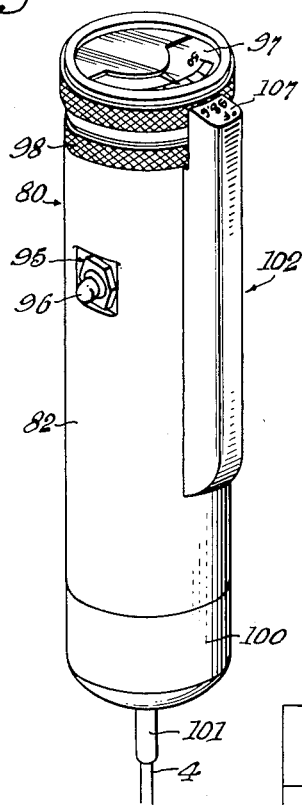
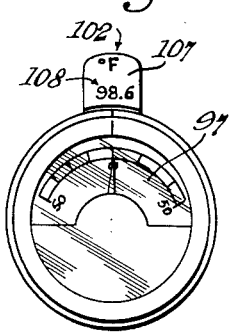
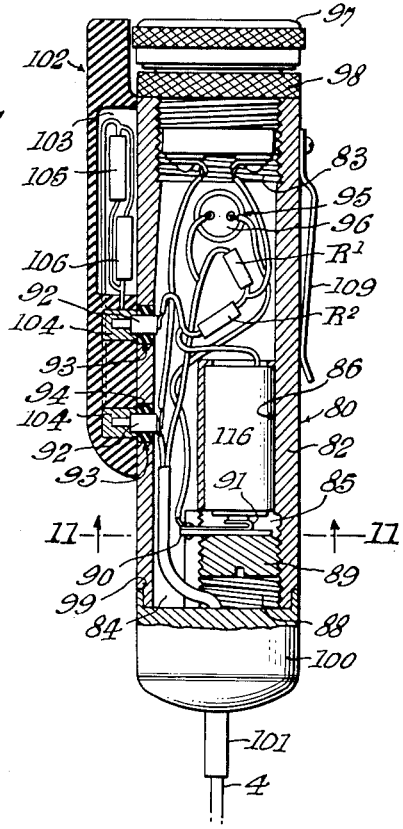
INVENTORS
GEORGE T. PERKINS
J EMERSON COLBY
BY
ATTORNEYS United States Patent Office 2,753,714
Patented July 10, 1956

2,753,714

ELECTRIC THERMOMETER

George T. Perkins and J. Emerson Colby, Battle Creek, Mich., said Colby assignor to said Perkins Application July 21, 1953, Serial No. 369,537

5 Claims. (Cl. 73—362)

(Granted under Title 35, U. S. Code (1952), sec. 266)

The invention described herein may be manufactured and used by or for the Government for governmental purposes, without payment to us of any royalty thereon.

This invention relates to a thermometer and more particularly to an electrically operated thermometer employing a "Thermistor" which is a mixture of basic or metallic oxides exhibiting negative coefficients of temperature as the thermal sensing element. It is well known to devise temperature measuring devices employing resistance, thermostatic and thermocouple elements, as well as the more generally used instruments using mercury columns or other liquids which have uniform expansion characteristics. The resistance, thermostatic and thermocouple devices are generally bulky, not uniformly accurate and not particularly suited to such uses as measuring and recording mammalian temperatures, both surface and internal, under varying biological conditions, for example, clinical temperatures on human beings. The liquid column type must not only be "shaken down" to an initial condition before use but require a much longer time to obtain a reading than the device of the instant invention. In the field of clinical thermometry in which the instant invention is particularly well suited no essential changes in the glass, mercury column type have occurred during the past eighty-six years.

The glass-mercury column type is breakable and subject to three kinds of changes: (1) Progressive changes in glass with time and use; that is, glass undergoing processing goes through changes due to inherent strains, thereby causing dimensional changes; (2) temporary changes due to heating, and (3) a rise in reading due to annealing. All of the above, combined with thermometric lag, contribute to inaccuracies found in most mercury thermometers. Further, it takes three minutes for a glass-mercury thermometer to reach maximum and five to seven seconds for shake-down and its use becomes even more time consuming over extreme ranges of temperature, i. e. in tropical climates. Mercury thermometers would be destroyed in ambients over 120° F. and military transportation at times far exceed a safe temperature.

Thermometers using resistance and thermocouples have not been used successfully for clinical use due to certain apparent inconsistencies and reproducibility of thermocouples. Resistance thermometers lack sensitivity due to small change in resistance with increase in temperature. Both resistance and thermocouple types require bulky recording apparatus and some means to compensate each thermocouple to the instrument. Thermometric lag due to reference junction and unsatisfactory contact potential limits these types for clinical application. Using thermocouples, a reference junction is required, i. e., a junction in which the temperature is known precisely. In addition, a second thermocouple at the temperature of melting ice or exposed to ambient with a liquid thermometer adjacent to the junction is required to establish the reference temperature.

In view of the difficulties inherent in the devices heretofore used, particularly regarding their adaptation for clinical and general temperature measuring uses, it is the principal object of the present invention to provide a thermometer which is extremely sensitive, uniformly accurate, permits rapid response, is time saving and rugged yet compact in construction and may be adapted to a variety of general temperature measurements such as clinical use, measuring and recording ambient temperatures, and temperatures of liquids and solids.

It is a further object of the instant invention to provide a temperature measuring device, the accuracy and operation of which is not adversely affected by extreme ambient temperature variations as in the case of a mercury thermometer.

It is a further object of the instant invention to provide a temperature measuring device which may be readily adapted for various ranges.

It is a further object of the present invention to provide a thermometer wherein a removable probe including a "Thermistor" may be accurately matched electrically to an associated indicator.

Further objects and advantages of the present invention will become apparent as the description proceeds and the features of novelty will be pointed out in particularity in the appended claims.

The invention will be understood more readily from reference to the accompanying drawings, in which:

Fig. 1 is a view showing the assembled relation of the components of the thermometer;

Fig. 2 is a sectional view of the probe and connector assembly;

Fig. 3 is an enlarged sectional view of the end of the probe showing the arrangement of the sensing element;

Fig. 4 is a schematic diagram of the electrical circuit in which the probe is shown as one arm of a Christie bridge;

Fig. 5 shows a modified form partly in section combining the probe and indicating instrument;

Fig. 6 is an enlarged partial sectional view of a modified form of connector assembly for connecting the probe to the indicating instrument;

Fig. 7 is another view showing the modified probe of Fig. 6 separated from the cooperating cable connector;

Fig. 8 is a perspective view of a further modification of the recording portion of the device including an external probe matching resistor;

Fig. 9 is a partial longitudinal sectional view of the modified form of Fig. 8;

Fig. 10 is a view in elevation of the face of the meter in the modified form of Fig. 8;

Fig. 11 is a cross-sectional view taken on the line 11—11 of Fig. 9;

Fig. 12 is a view of the end cap portion of the form of Fig. 8 modified to include an internal probe matching resistor;

Fig. 13 is a partial sectional view of the end cap portion of the modified form of Fig. 12; and Fig. 14 is a cross-sectional view taken on the line 14—14 of Fig. 13.

Referring first to Fig. 1, there is shown one embodiment of the invention in which the probe shown generally by 1, one end of which contains the sensing element 2, is connected by means of a coaxial type connector 3 through cable 4 to an indicating instrument shown generally at 5 having a pointer 12 and dial plate 10 which is housed in a suitable casing 6 made of "Kel–F," a thermal setting plastic of high and low polymers of trifluorochloroethylene compound which is insulating both thermally and electrically. Mounted on the casing 6 is a switch button 7 for connecting the meter in circuit when the device is in use. A loop 8 is also provided on the case 6 to facilitate carrying or attaching the instrument to the person by means of a strap or other means, not shown, which will conveniently free the user's hands for other purposes. Cable 4 passes through a flexible insulating strain relief 9 and is connected to terminals in the indicating instrument 5 in any suitable manner. Housed within the casing 6 are the components shown schematically in Fig. 4 with the exception of the probe, which together with the connecting cable 4, constitutes an arm of the normally balanced bridge circuit. The bridge circuit which operates on the Christie principle, includes the resistors $R_1$, $R_2$, $R_3$ and the sensing element together with its connecting cable 4 is shown collectively as $R_4$, and constitutes an arm of the bridge circuit which is connected in the conventional manner. The "Thermistor" constituting the principal part of the arm $R_4$, is a commercially available product in the form of a small disc of 0.042 in. diameter composed of oxides of manganese, nickel and cobalt fused to two platinum wires which is adjusted for use in the device to electrical tolerances accurate to within 0.01 per cent.

The accuracy of all components of the instrument is plus or minus 0.5 degree while the calibrated dial is limited to the divisions as indicated and the parallax involved in reading the meter.

The "Thermistor" is a temperature sensitive resistor having a negative temperature coefficient of −3.9 per cent per degree C. at 25° C. and a resistance of 5,800 ohms at 0° C., 2000 ohms at 25° C. and 800 ohms at 50° C. In the device of the instant invention the "Thermistor" is mounted in one end of the probe 1 in the manner shown by Fig. 3 and described more fully hereinafter. While the above electrical characteristics have been described, it is to be understood that "Thermistors" with different negative coefficients of temperature may be used in conjunction with the bridge circuit and indicating instrument 5 to adapt the device to various temperature ranges requiring the substitution of resistors of appropriate value for $R_1$, $R_2$ and matching resistor $R_3$ and a dial plate 10 carrying the desired range of temperatures. Two paths are provided for the current, one through the ratio arms $R_1$ and $R_2$, the other through the resistance $R_4$, constituting the "Thermistor" and its connecting cable 4, and resistance $R_3$. The resistance $R_3$ has a value equal to the resistance of $R_4$ at 60° F. or 2000 ohms. While the resistance $R_3$ has been shown as a fixed resistor equal in value to the combined resistance of the "Thermistor" and its connecting cable 4, it is to be understood that a variable resistor may be used to accomplish the adjustment necessary when substituting a probe having a different resistance value when it is desired to change the range of the instrument and maintain a balanced bridge condition upon such substitution. The ratio arms of the bridge circuit are of a value to obtain maximum sensitivity without introducing objectionable power dissipation in the sensing element or drawing excessive current from the power source. The resistors used in the bridge circuit are the commercially available precision wire wound type, whose resistance remains electrically stable over a range of approximately −50° C. to 105° C. The extremely low temperature coefficient of resistance (plus or minus 0.00002) per degree C., make these resistors particularly adaptable as resistance standards in a direct current instrument that is used in varying ambient environments.

The meter 11, which is connected between the junctions of $R_1$, $R_2$ and $R_3$, $R_4$, is a micro-ammeter of the D'Arsonval type which is designed for constant current accuracies over a wide range of ambient temperatures and reads substantially linear for temperatures within the range desired. The dial plate 10 is marked in degree divisions or other convenient indicia depending on the range desired. The dial plate 10 may be printed or coated with a luminous material or the instrument may have an internally mounted light source in a manner well known in the art to illuminate the dial and permit viewing in darkness. Batteries 13 are connected between the positive junction of $R_1$, $R_4$ and negative junction $R_2$, $R_3$. A switch 14 actuated by switch button 7 controls the voltage applied to the bridge circuit. When voltage is applied to the bridge circuit by closing the switch 14, with the probe connected as shown in Fig. 1, and $R_1$ equals $R_2$ and $R_3$ equals $R_4$ at 60° F. no current flows through the meter 11. As the temperature of $R_4$ is increased, the resistance of $R_4$ decreases, unbalancing the bridge causing current to flow through the meter 11. With appropriate indicia marked on dial plate 10, direct reading of temperature in seven seconds maximum is possible dependent upon placement. When the switch 14 is opened the needle or pointer 12 is immediately returned to zero, thus instantly making the device available to take another reading. This operation permits great saving in time over the present method using mercurial thermometers thus permitting repeated readings with extreme accuracy, sensitivity and speed. When using the instrument as a clinical thermometer, the bridge is balanced for a sensing element temperature of 98.6° F. and other temperatures are read as unbalance. The batteries 13 are of a type having a mercurous-oxide electrolyte, which always maintain an open-circuit voltage of 1.345 volts per cell and which have no appreciable voltage drop during their life cycle, thus eliminating the necessity of a switching arrangement with potentiometer to stabilize the voltage applied to the bridge circuit, as would be necessary if convential zinc type batteries were used.

The probe shown generally at 1, which together with its connecting cable 4 forms one arm of the normally balanced bridge crictuit, is shown in detail in Fig. 2. It is comprised principally of an outer thermal and electrical insulating sleeve 15 having at one end a cavity 16 which connects with a central longitudinal passage 17 terminating with an internally threaded portion 19. A metallic member 20 which may be fabricated from silver plated copper or brass, coin silver or other electrical conducting material having high thermal conductivity provides a thermal path from the contacted surface to the "Thermistor" element 22. The member or thermal sink 20, as shown in greater detail in Fig. 3, consists of a plano-convex portion 23 having on its plano surface 24 a cylindrical portion 25 of smaller diameter than the plano-convex portion 23 and integral therewith. The cylindrical portion 25 and plano surface 24 form a well 26 in which the "Thermistor" 22 is mounted by soft soldering to the plano surface 24 in a manner to provide a uniform thermal insulating space 27 between the "Thermistor" and the internal walls of the cylinder 25. A portion 28 of the cylinder farthest from the plano surface 24 is of greater thickness than the remainder of the cylinder wall and is provided with external threads 29 for engagement with the internal threads 19 of the sleeve 15. When the thermal sink 20 is fully screwed down to its final position in the end of the sleeve 15 a thermal insulating space 30 is formed between the sleeve 15 and the cylinder wall by virtue of the difference in thickness of the cylinder wall. The plano-convex portion 23 of the thermal sink 20 being of greater diameter than the cylindrical portion 25 forms a shoulder 31 which closes the aperture 18 to complete the thermal insulating space 30. Any suitable sealing material may be applied to the shoulder 31 of the thermal sink 20 to secure it to the insulating sleeve 15 but care must be exercised so as not to fill the thermal insulating space 30. A conductor 32 is connected as by soldering or other suitable means to the end of the "Thermistor" opposite the end in contact with the plano surface 24 and a second conductor 33 is fastened in a suitable manner to the cylindrical portion 25 of the thermal sink 20. Conductors 32 and 33 are carried in the longitudinal passage 17. The female portion of the connector consists of an outer conducting cylindrical portion 35 having arranged therewith internally a concentric conducting member 36, one end of which has a recessed portion 37. Conducting member 36 is insulated from the outer conducting portion 35 by a tubular member 38 of electrical insulating material. The outer conducting portion 35 is provided with external threads 39 for a portion of its length for engagement with the male portion of the connector. An external shoulder 41 is formed midway of the portion 35 and the remaining portion 42 of this latter member is of smaller diameter than the shoulder 41 and adapted to be received in the cavity 16 closing the passage 17. Conductor 32 is connected to member 36 and conductor 33 is connected in a suitable manner to the portion 35. The male portion of the connector comprises an outer conducting member or ferrule 43 having internal threads 44 for engagement with external threads 39 on the conducting portion 35. The conducting member 43 is free to rotate about an inner conducting member 45 having a central longitudinal passage 46 with a cylindrical cavity 47 adjacent one end to receive the cable 4. The outer surface of the member 45 is provided with a shoulder 48 and a ring 49 partially recessed in the member 45 to limit the travel of the ferrule or conducting member 43. An electrical insulating member 50 having a longitudinal passage 51 is arranged in the passage 46. A conducting tapered pin 52 is securely fastened in the passage 51 and protrudes beyond the end of the conducting member 45 opposite the cavity 47. Conductors 53 and 54 arranged in insulating relation in cable 4 are connected respectively to pin 52 and conducting member 45 in any suitable manner. Electrical connection of the probe 1 and indicating instrument 5 is accomplished by screwing the conducting member 45 onto the threaded end of the conducting member 35 which forces the pin 52 into the recess 37 and causes the members 35 and 45 to contact.

Figs. 6 and 7 illustrate a modified form of coaxial connector. The principal difference over the form shown in Fig. 2 is the reversal of the male and female parts of the connector and elimination of the threaded parts as illustrated in Figs. 6 and 7, permitting quicker connection of the probe to the cable. As shown in Fig. 6, the male portion of the connector comprises an outer cylindrical electrically conducting member 55 having a shoulder 56 formed midway on the outer surface thereof. About one-half of the cylindrical member 55 is adapted to be securely fitted into the cavity 16 of the sleeve 15 to the extent permitted by the shoulder 56. The remaining portion of the cylindrical member 55 extends beyond the sleeve 15 and has a peripheral groove 57 and a tapered portion 58 to facilitate insertion in the portion of the connector attached to the cable 4. A pin 59 centrally located within the cylindrical member 55, extends longitudinally thereof and protrudes beyond the ends thereof. The pin 59 is electrically insulated from the cylindrical member 55 by insulating material 60 extending internally for the length of the cylindrical member 55. The female portion of the connector comprises a cylindrical electrically conducting member 61 which is tapered externally for a portion of its length adjacent one end thereof as at 65. The cylindrical member 61 has an internal passage 62 which extends longitudinally for a distance approximately equivalent to the tapered external surface portion and is coextensive with a passage 63 of greater diameter than the passage 62 to provide a receptacle to receive the male portion of the connector. The cylindrical member 61 is of substantial thickness and has an internal circumferential recess 64 adjacent the end opposite the tapered portion for the seating of a single loop or coil 66 of resilient material for a purpose to be hereinafter described. Additionally, the passage 63 has a slightly beveled inner edge 71 to facilitate joining the two parts of the connector. A part of the passage 63 adjacent the passage 62 has arranged therein an electrical insulating member 67 having a central longitudinal passage 68 in which is located an electrical conducting member 69 having a longitudinal recess 70 extending a substantial part of the length of member 69. The remaining portion of the passage 63 is intended to receive the male portion of the connector. An electrical insulating rubber sleeve 72 extends from the tapered end of the member 61 and envelopes the cable 4 where it enters the connector. The sleeve 72 is secured at one end inside the tapered end of member 61 in any suitable manner. The sensing element in the probe end is connected by conductors 32 and 33 to pin 59 and member 55, respectively, of the male part of the connector. To connect the probe to the indicating instrument 5 through cable 4, the two parts of the connector shown in Fig. 7 are joined as shown in Fig. 6 whereupon the pin 59 is received in the recess 70 and the resilient loop 66 snaps into the groove 57 providing a good connection between the parts of the connector yet one that lends itself to being simply and quickly detached. The electrical circuit to the indicating instrument 5 is completed by conductors 53 and 54, arranged in insulating relation in cable 4, connected respectively to conducting members 69 and 61.

In Fig. 5 there is shown a modified form of the invention which is particularly adapted for taking surface temperatures by contact with the particular surface. In this modification a probe 1 similar in structure to that shown in Fig. 2 is mounted for reciprocating motion in an opening 72 in the indicating instrument case 6. The terminal structure in this modification is similar to that shown in Fig. 6 with the exceptions that the peripheral groove 57 and the tapered portion 58 are omitted and an additional shoulder 74 is added in a position on the member 55 to retain the probe in position in the opening 72, yet permits the pin 59 to extend beyond the shoulder 74. The opening in the case 6 is of slightly larger diameter than the greatest probe diameter and has an internal shoulder 75 adjacent the inner part of the opening 72 communicating with the interior of the case 6 which engages the shoulder 74 on the probe to retain it in position in the opening 72 against the force of the spring or other resilient means 76. A contact arm 77 is located internally of the case 6 in a position to permit contact with the pin 59 when the probe 1 is forced inwardly against the action of the spring 76 to connect the probe to the indicating instrument 5 through conductors 78 and 79. The arm 77 is secured internally to the case 6 in any suitable manner. The spring 76 is of such resiliency as to permit the weight of the indicating instrument portion 5 of the device to compress the spring 76 thus completing a circuit through contact arm 77 and pin 59 when the end of the probe 1 containing the thermal sink 20 is in contact with a surface, the temperature of which is desired.

In Fig. 8 there is shown a modified housing or case 80 for the recording portion of the device which may be used in a pocket-type structure. The probe matching resistors may, in this pocket-type arrangement, be mounted externally in a plug-in fashion as shown in Figs. 8 and 9 so the probe matching resistor corresponding to a particular probe and temperature range may be quickly connected on the case 80, or the probe matching resistor may be mounted internally and the case 80 modified as shown in Figs. 12, 13 and 14 so that by rotating the end cap 81, the proper matching resistor corresponding to a particular probe and temperature range may be selected. The modification wherein the probe matching resistor is mounted externally on the housing for the recording portion comprises a tubular member 82 shown here of metal but which may be made of any suitable material, provided with internal threads 83 at one end thereof. Arranged internally adjacent the opposite end of the tubular member 82 is a cylindrical well divided into two longitudinally aligned portions 85 and 86. The well is formed integrally with the internal wall of the tubular member 82 so that a portion of the wall of the well is common with the internal wall of the member 82. The outside diameter of the well is smaller than the internal diameter of the tubular member 82 providing a clearance space 84 between the exterior wall of the well and the interior wall of the tubular member 82 to accommodate wiring or other components of the recorder portion of the device. The portion 86, in longitudinally registering relation with the portion 85, serves as a receptacle for a battery 116 and has an opening 87 on the innermost end permitting electrical connection to the battery 116. The portion 85 is internally threaded as at 88 so that a set screw 89 may be screwed down onto a contact plate 90 carrying a contact arm 91 providing electrical contact with the battery 116. The portions 85 and 86 combined are considerably less in length than the total length of the tubular member 82 and the outermost end of the portion 85 is in registering relation with the corresponding end of the tubular member 82. Terminals 92 project through apertures 93 of the tubular member 82 for a purpose to be hereinafter described. The terminals 92 are insulated from the tubular member 82 by any suitable insulating material 94. Another aperture 95 is provided in the tubular member 82 to permit mounting a switch 96 which controls the energizing source to the bridge circuit. A meter 97 which may be a 50-0-50 or a 0-100 microammeter is mounted in the end of the tubular member 82 which is provided with internal threads 83 by means of an externally threaded locking ring 98 engaging threads 83. Each division to right and left of zero adds and subtracts, respectively, from the bridge balancing temperature. The end of the tubular member 82 opposite the internally threaded end is provided with an external circumferential shoulder 99 for frictionally engaging an end cap 100. The cable 4 from the probe 1 passes through an insulating sleeve 101 in the end cap 100 into the interior of the housing 80. A member 102 of insulating material having a cavity 103 and terminal contacting members 104 mutually spaced, is detachably mounted by means of terminals 92 externally of the housing 80 and extends longitudinally for a substantial length of the housing 80. The matching resistor housing member 102 contains resistors 105 and 106 which are equivalent in value to the matching resistor $R_3$ in the bridge circuit shown in Fig. 4. In the embodiment shown in Figs. 8 and 9, whenever it is desired to change probes to cover various temperature ranges, the corresponding matching resistance may be inserted in the bridge circuit for the $R_3$ arm by merely connecting a member 102 containing the proper value of resistance which electrically matches that of the probe and its connecting cable. In this way various ranges may be obtained through the use of plug-in type probe resistance matching units or members 102. In the modification shown in Figs. 8 and 9, the member 102 is mounted on the terminals 92 in such fashion that end portion 107 containing the temperature value 108 at which the bridge is balanced is in the same horizontal plane as the face of the meter 97 and the indicia on the end 107 indicates the temperature at which the bridge is balanced or zero position of the meter. A clip 109 is suitably fastened to the exterior of the housing 82 approximately diametrically opposite the probe matching resistor housing 102 to permit wearing the device on clothing. Resistors $R_1$ and $R_2$, the remaining arms of the bridge and the necessary wiring are arranged in the interior of the housing 80. While the resistors 105 and 106 are shown connected in parallel, it is to be understood that other connections may be used depending on the components and value desired, and instead of being contained in the cavity 103 may be potted or molded into the insulating material 102.

Instead of mounting the probe matching resistors externally of the housing 80, the modifications in Figs. 12, 13 and 14 show a possible arrangement for mounting such resistors internally and by rotating the end cap 81, thus aligning the arrow 110 with a particular reference mark 111 corresponding to a predetermined value of probe matching resistor. A possible arrangement of the internally mounted resistors is shown in Figs. 13 and 14. An upstanding hollow member 112 having a contact arm 113 integrally formed therewith and at right angles to member 112 is attached internally to the center of the end cap 81. Probe cable 4 is connected to the circuit components internally of the housing by passing through the hollow portion of member 112. An insulating bracket 114, to which contact members 115 are attached in any convenient manner, is secured internally of the housing 80 in a position such that contact arm 113 when rotated by turning end cap 81 may make contact successively with at least one of the contact members 115. Since the contact members 115 are individually connected to probe matching resistor elements of predetermined value, rotation of the contact arm 113 permits selection of the correct matching resistance whenever a change of probes, to cover a new range of temperatures, is desired. The end cap 81 in the embodiment shown in Figs. 12, 13 and 14 is frictionally secured to the housing 80 and is free to rotate.

In view of the fact that the probe containing the sensing element is connected to the indicating instrument by means of a cable, the effect of which in the circuit may be compensated by a variable series resistor, it is also possible with the instant invention to take temperatures and record them at a remote point on a single large size meter or by recording apparatus such as a continuously recording galvanometer. It is evident that with such a device, for example, a nurse may record at a central point temperatures of patients located in distant rooms.

Of particular significance in the instant device are the material and method used for mounting the "Thermistor." The inherent sensitivity of the "Thermistor" remains the same, but the time of response to changes in temperature is seriously affected by mass and thermal conductivity of the mounting material.

A preferred form of the probe of the instant invention incorporating a mounting combining high thermal conductivity with critical mass for a "Thermistor" having the required characteristics for use in clinical thermometers includes a sleeve of the thermal setting plastic "Kel-F" previously described, which is unaffected by immersion in sterilizing solutions. The probe 15 is four inches long having an outside diameter of 0.2 inch at the large end and tapering to 0.125 inch diameter at the small end with a wall thickness of about 0.05 inch. The thermal sink 20 which is screwed in the small end of the sleeve 15 has a plano-convex portion 23 which is 0.125 inch in diameter and 0.01 inch thick at the center. The cylindrical portion integral with the plano side is 0.075 inch long and has a wall thickness of 0.0185 inch. The well 26 is 0.059 inch in diameter and when the "Thermistor" is mounted therein the thermal insulating space 27 is about .0085 inch. The thermal insulating space 30 is about 0.0092 inch. An increase in thickness or mass of the plano-concave portion 24 of the thermal sink 20 seriously affects the sensitivity or time response of the instrument and the dimensions of the thermal sink 20 must be held to very close tolerance, plus or minus 0.0001 inch. For each increase of 0.0001 inch in the thickness of the plano-concave portion 24, a decrease of 1 second in sensitivity results.

While particular embodiments of the invention have been described and illustrated, it will be understood that it is intended and desired to embrace within the scope of the invention such modifications and changes as may be necessary or desirable to adapt the invention to varying conditions and uses, as defined in the appended claims.

Having thus described our invention, what we claim as new and wish to secure by Letters Patent is:

1. A probe for temperature measuring apparatus comprising, in combination, a tubular member, thermal conductor means mounted in an end of said tubular member including a closure portion for sealing the end of said tubular member and an inwardly extending cylinder integrally formed with said closure portion and coaxial with said tubular member, said cylinder comprising first and second annular sections, said first annular section being of lesser outside diameter than the inside diameter of said tubular member and joined to the inner face of said closure portion, said second annular section having an outside diameter equal to the inside diameter of said tubular member and joined to the inner end of said first annular section in axial alignment therewith, said second annular section engaging the inside wall of said tubular member in sealing relation therewith defining a thermal insulating space between the outer wall of said first annular section and the inside wall of said tubular member, said annular sections and said closure portion forming a well, thermal sensing means comprising a mixture of metallic oxides wholly contained within said well and contacting the inner surface of said closure portion, said thermal sensing means being mutually spaced from said cylinder wall, connecting means carried in the end of said tubular member remote from said sealed end for connecting said sensing means to an external indicator, conductor means within said tubular member connecting said thermal sensing means to said connecting means.

2. A probe for temperature measuring apparatus comprising, in combination, a tubular member, thermal conductor means mounted in an end of said tubular member including a plano-convex closure portion for sealing the end of said tubular member and an inwardly extending cylinder integrally formed with the plano surface of said closure portion and coaxial with said tubular member, said cylinder comprising first and second annular sections, said first annular section being of lesser outside diameter than the inside diameter of said tubular member and joined to the inner face of said closure portion, said second annular section having an outside diameter equal to the inside diameter of said tubular member and joined to the inner end of said first annular section in axial alignment therewith, said second annular section engaging the inside wall of said tubular member in sealing relation therewith defining a thermal insulating space between the outer wall of said first annular section and the inside wall of said tubular member, said annular sections and said closure portion forming a well, thermal sensing means comprising a mixture of metallic oxides wholly contained within said well and contacting the plano surface of said plano-convex closure portion, said thermal sensing means being mutually spaced from said cylinder wall, connecting means carried in the end of said tubular member remote from said sealed end for connecting said sensing means to an external indicator, conductor means within said tubular member connecting said thermal sensing means to said connecting means.

3. A probe for temperature measuring apparatus comprising an elongated member having an axial passage therethrough, thermal conductor means including a closure member sealing one end of said axial passage and an upstanding portion extending inwardly lengthwise of said axial passage, said closure member and said upstanding portion forming a well communicating with said axial passage, said upstanding portion including a first section of lesser outside dimension than said axial passage and joined to said closure member, a second section joined to and axially aligned with said first section and having an outside dimension equal to the inside dimension of said axial passage and engaging the wall of said axial passage in sealing relation therewith to define a thermal insulating space between said first section and the wall of said axial passage, thermally responsive sensing means wholly contained within said well and having a surface thereof contacting said closure member, and means carried in the end of said elongated member remote from said sealed end for connecting said sensing means to an external indicator.

4. A probe as defined in claim 3 wherein said connecting means comprises first and second portions, said first portion having a longitudinal bore and a circumferential collar formed on its external surface, said first portion projecting into the central passage of said elongated member to the extent permitted by said collar, the external surface of said first portion projecting beyond said elongated member having threads thereon, a first electrically conducting rod member arranged concentrically within the bore of said first portion and insulatingly separated therefrom, a cavity in the protruding end of said first rod member, said second portion including an internally threaded ferrule arranged for rotating and longitudinal movement about a member located within said ferrule having an external shoulder adjacent one end thereof and stop means mutually spaced from said shoulder, said ferrule extending beyond the end of said member said stop means and said shoulder cooperating to limit the longitudinal travel of said ferrule, a second electrically conducting rod member concentrically arranged within said member and insulatingly spaced therefrom, an end of said second rod member projecting beyond the corresponding end of said member whereby when said threaded portions of said first portion and said ferrule are engaged said second rod member is forced into said cavity on said first rod member and completes a connection between said first and second portions.

5. A probe as defined in claim 3 wherein said connecting means comprises first and second portions, said first portion including a first tubular member having a collar formed midway on its external surface to limit the extent of insertion of said first tubular member in said central longitudinal passage, a circumferential groove on a portion of the external surface of said first tubular member projecting beyond said longitudinal passage, an electrically conducting rod member arranged concentrically within said first tubular member and insulatingly separated therefrom, said rod member protruding beyond the ends of said first tubular member, said second portion including a socket member, a circumferential recess located interiorly of said socket member adjacent the open end of said socket, a terminal member arranged concentrically within said socket member, insulating means separating said terminal and socket members, said socket and insulating means occupying a portion of the volume of said socket below said circumferential recess and adjacent the closed end of said socket, resilient means arranged in said circumferential recess, a cavity located at one end of said terminal member and having its longitudinal axis parallel to the longitudinal axis of said terminal member for reception of said rod member when said first and second portions are joined and said resilient member seats in said circumferential groove completing electric contact between said first tubular member and said socket member.

References Cited in the file of this patent

UNITED STATES PATENTS

| | | |
|---|---|---|
| 2,027,277 | Habann | Jan. 7, 1936 |
| 2,102,030 | Quereau | Dec. 14, 1937 |
| 2,379,317 | Picciano | June 26, 1945 |
| 2,612,780 | De Bruyne | Oct. 7, 1952 |

FOREIGN PATENTS

| | | |
|---|---|---|
| 597,420 | Great Britain | Jan. 26, 1948 |
| 634,444 | Great Britain | Mar. 22, 1950 |

OTHER REFERENCES

"The Design of Thermistor Thermometers With Linear Calibration," Beakley Journal of Scientific Instru., vol. 28, No. 6, pp. 176–179, June 1951.